United States Patent [19]

Robertson

[11] Patent Number: 4,535,802

[45] Date of Patent: Aug. 20, 1985

[54] TWIST-CAM REFRIGERANT DISPENSING VALVE

[76] Inventor: James D. Robertson, 231 NW. 69 Way, Hollywood, Fla. 33024

[21] Appl. No.: 574,309

[22] Filed: Jan. 26, 1984

[51] Int. Cl.³ ............................................. F25B 45/00
[52] U.S. Cl. ....................................... 137/322; 62/292; 137/614.05; 141/349; 222/509; 251/263; 251/291; 251/339; 251/354
[58] Field of Search ............... 137/212, 223, 231, 322, 137/315, 317, 614.05; 62/55, 292; 141/38, 348, 349, 383; 222/509; 251/120, 121, 251, 263, 291, 339, 354; 285/239

[56] References Cited

U.S. PATENT DOCUMENTS

| | | | |
|---|---|---|---|
| 1,509,862 | 9/1924 | Edick | 251/258 |
| 2,408,006 | 9/1946 | Smith | 251/120 |
| 3,645,496 | 2/1972 | Rawlins | 137/322 |
| 3,680,591 | 8/1972 | Vik | 137/614.05 |
| 3,916,641 | 11/1975 | Mullins | 62/292 |
| 3,976,110 | 8/1976 | White | 137/614.05 |
| 3,996,765 | 12/1976 | Mullins | 62/292 |
| 4,009,729 | 3/1977 | Vik | 137/614.05 |
| 4,328,948 | 5/1982 | Pearl, II | 251/149.4 |
| 4,332,273 | 6/1982 | Boyce | 62/292 |
| 4,476,892 | 10/1984 | Boyce | 137/322 |

Primary Examiner—George L. Walton
Attorney, Agent, or Firm—Herman J. Hohauser

[57] ABSTRACT

A manually operable valve apparatus capable of temporary attachment at one end directly to a refrigeration apparatus which is to be charged with a pressurized refrigerant, such as from a portable source of refrigerant, the present valve apparatus can be attached at its opposite end to a hose or the like to communicate with a pressurized source of refrigerant. The valve comprises an internal spring-loaded valving element having pins at each end which each contact a needle element at opposite ends of said valving element. One of the needle elements is directly biased by a cam twisted by finger manipulation against one of the pins of the valving element to displace against spring pressure the other pin, thereby displacing the other needle element to allow pressurized refrigerant to flow from the refrigerant source through the valve apparatus. Flow of refrigerant is stopped by turning of the cam to a position whereby the first needle element does not bias against the first pin, thereby allowing the valving element to return to a non-flow position under influence of the spring. Flow of pressurized refrigerant from a source to a refrigeration apparatus during charging of the apparatus is thus controlled by finger manipulation between open and closed positions of the present valve apparatus.

9 Claims, 3 Drawing Figures

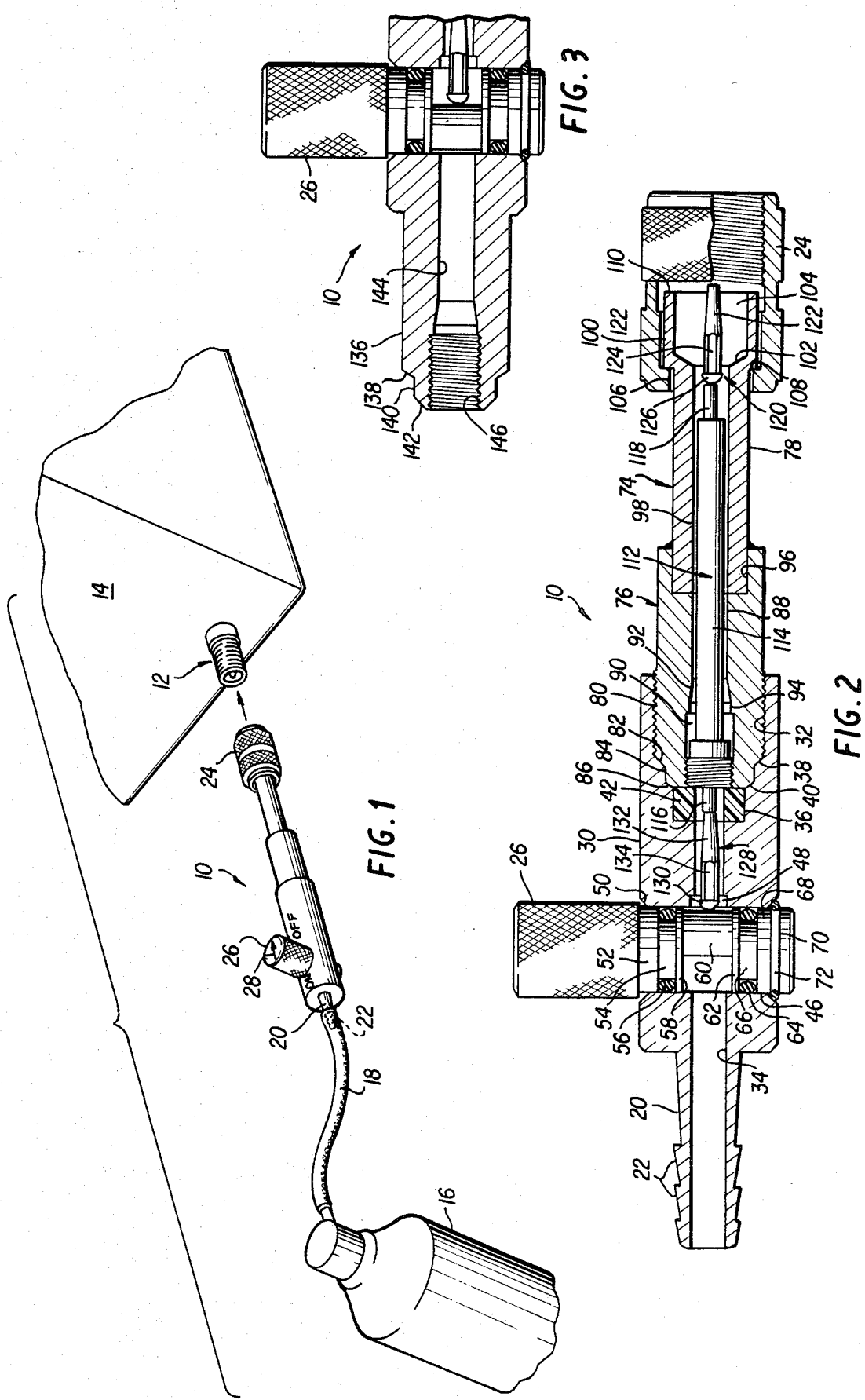

TWIST-CAM REFRIGERANT DISPENSING VALVE

BACKGROUND OF THE INVENTION

1. Field of the Invention

The invention relates generally to valving apparatus and particularly to valving apparatus for manually controlling flow of gas under pressure.

2. Description of the Prior Art

Controllable valves are well known in the art, such valves being capable of actuation through a variety of mechanisms including mechanisms which are manually manipulatable. As an example of prior art valves operable in a manual fashion, U.S. Pat. No. 2,408,006 to Smith describes a hydraulic valve having a spring-loaded pin element which can be displaced between flow and non-flow positions by means of a rotary cam controlled by a handle which can be manually grasped for rotation of the cam. A similar cam-controlled valve is described by Edick in U.S. Pat. No. 1,509,862, a thumb-turn element rotating a cam member which biases a spring-biased plunger element between positions which allow flow of fluid through a valve aperture. Strout, in U.S. Pat. No. 2,225,759, describes a spray gun nozzle having a valving element actuable on inward movement of a pin, a cam element which is rotated through connection to a handle being turned to displace the pin. The handle of Strout can be manually grasped to move the cam element between open and closed positions. Pickup, in U.S. Pat. No. 2,129,100, describes a dual cam mechanism which alternately displaces spring-loaded pin elements between positions which control flow of a fluid. In U.S. Pat. No. 1,774,918, Hall et al describe a manually operable handle which biases a cylindrical element against a pin to open a valving element in a valve apparatus. Whittemore, in U.S. Pat. No. 3,515,442, describes a hydraulic brake lock comprising a valving element actuable on displacement of a pin to allow fluid flow. While the prior art has provided valving apparatus of many types and capable of a variety of different functions, the prior art has not provided the particular valving apparatus of the present invention wherein temporary attachment can be made between a refrigeration apparatus which is to be charged with a pressurized refrigerant and a source of refrigerant, which source can be a portable source, with the flow of refrigerant being controllable by finger manipulation of a cam element in the present valve apparatus, the present valve apparatus being portable and being rapidly attached and detached from the refrigeration apparatus as well as from the source of refrigerant without the use of tools of any description. The invention thus provides cost and operational advantages.

SUMMARY OF THE INVENTION

The invention provides a manually operable valve apparatus which is preferably used to attach a source of pressurized refrigerant gas to a refrigeration apparatus which is to be charged with said gas, a distal portion of the present valve apparatus being configured to be removably attached to an inlet port of the refrigeration apparatus. The opposite end of the present valve apparatus is adapted to receive a pressure hose or similar tubing at one end of the hose, the other end of the hose connecting to a source of the pressurized refrigerant gas. The valve apparatus of the invention not only connects the refrigeration apparatus to a source of pressurized refrigerant gas for charging, the present valve apparatus also allows manual manipulation of a rotary thumb turn to actuate an internal cam element which opens and closes in selected fashion to control flow of the refrigerant gas between the source of the gas and the refrigeration apparatus which is to be charged with the gas. The present valve apparatus thus allows a user to readily control the flow of a gas under pressure between two points, thereby particularly facilitating the charging of a refrigeration apparatus on site by virtue of the portability of the present valve apparatus and the ability of said valve apparatus to adapt to use with differing sources of pressurized refrigerant gas including portable sources.

Accordingly, it is an object of the present invention to provide a manually operable valve apparatus which is capable of temporarily connecting a source of pressurized refrigerant gas with a refrigeration apparatus which is to be charged, the present valve apparatus being manually manipulated to a position allowing flow of gas therethrough or to a position which does not allow passage of gas through the valve apparatus.

It is another object of the present invention to provide a valve apparatus having an internal camming element which is controlled by an external rotary member which can be twisted by means of finger manipulation to actuate or to close a valving element disposed internally of the present valve apparatus, thereby to control passage of gas through said valve apparatus.

It is a further object of the present invention to provide a simple and inexpensive valve apparatus capable of portable usage on site to charge a refrigeration apparatus from a portable source of refrigerant gas.

Further objects and advantages of the invention will become more apparent in light of the following detailed description of the preferred embodiment.

BRIEF DESCRIPTION OF THE DRAWINGS

FIG. 1 is a perspective view illustrating the present valve apparatus in a preferred use environment;

FIG. 2 is an elevational view in partial section of the present valve apparatus illustrating a barbed end connection feature and wherein the valve apparatus is in an open position which allows flow through said valve apparatus; and, FIG. 2 is an elevational view in partial section of a second embodiment of the invention illustrating a threaded connection feature and wherein the valve apparatus is in a closed position whereby gas is prevented from flowing through the valve apparatus.

DESCRIPTION OF THE PREFERRED EMBODIMENTS

Referring now to FIG. 1, a valve according to the invention is seen at 10 in a use environment wherein the valve 10 is detachably connected at a first end to a threaded port 12 which is associated with refrigeration apparatus 14 such as is comprised by an air conditioning unit or the like. The port 12 is used to charge the refrigeration apparatus 14 with a suitable refrigerant gas separately provided on site by a portable source 16 of pressurized refrigerant gas. The valve 10 is connected at its opposite end to the source 16 through a hose 18, one end of which is received on connector nipple 20 and the other end of the hose being connected to the source 16 of refrigerant gas. Connection of the hose to the connector nipple 20 is facilitated by the provision of transverse corrugations or annular barbs 22 which serve to hold the hose 18 to the nipple 20. Although the barbs 22 connect the nipple 20 to the hose 18 more positively, the hose 18 can be readily removed from the nipple 20 as desired by the manual application of force outwardly of the nipple 20.

The valve 10 connects to the port 12 by means of a threaded sleeve 24 which is mounted to the valve 10 for free rotation in a manner which will be described hereinafter and which is internally threaded to mate with the external threads provided on the port 12. The valve 10 can thus be readily and rapidly attached to and detached from the port 12 for charging of the refrigeration apparatus 14. The valve 10 is particularly useful with sources of pressurized refrigerant gas wherein the gas is contained in a can or the like which, when an outlet port thereof is severed, provides no effective control of the flow of gas from said can. The valve 10 is provided with a twist or thumb turn 26 which enables a user to open and close the valve 10 by simple manipulation of the thumb turn 26. The thumb turn 26 is mounted for rotation on the body of the valve 10 with the location as noted in FIG. 1 of the thumb turn 26 not allowing flow of gas through said valve 10 and as is indicated by arrow 28 on the thumb turn 26. Flow of gas through the valve 10 can be discontinued by rotation of the thumb turn 26 through 180° to the position noted "OFF" on the body of the valve 10, this position being at an angular arc of 180° from the "ON" position as noted on the body of the valve 10. The structure and function of the thumb turn 26, including operation of internal valving structure actuated on manipulation of the thumb turn 26 will be described in detail hereinafter.

As will be noted relative to the later discussion of FIG. 3, the valve 10 can be connected to the source 16 by other than a simple hose 18 received over a barbed nipple 20, the body of the valve 10 being capable of termination at the end opposite the threaded sleeve 24 in structure such as is shown in FIG. 3 and other structure comprising an internally threaded extension which receives an externally threaded connector (not shown) which can be fixedly attached to the end of a hose or which can extend from a source of pressurized gas for direct attachment to the valve 10.

Referring now to FIG. 2, the internal structure of the valve 10 can conveniently be seen. It is also to be noted that the embodiment of FIG. 3 is substantially identical to the embodiment of FIG. 2 with the exception of the use of a threaded extension member for connection to a source of refrigeration gas in the embodiment of FIG. 3 for the barbed nipple 20 as shown in FIG. 2. In FIG. 2, the valve 10 is seen to be in the "ON" position as determined by manipulation of the thumb turn 26 such that gas is allowed to flow through the valve 10 to charge refrigeration apparatus 14 or the like. In FIGS. 2 and 3, the valve 10 is shown disconnected from cooperating structure such as the port 12 or the hose 18 in order to simplify the description of the valve 10 itself. Due to the similarities between the major portions of the embodiments of FIGS. 2 and 3, a discussion of one of the embodiments will suffice in most aspects for the other embodiment. In particular, like elements of FIGS. 2 and 3 are identically numbered and described only relative to FIG. 2 with dissimilar elements of FIGS. 2 and 3 being described relative to the respective figures.

As seen now in FIG. 2, the valve 10 is seen to comprise a substantially cylindrical valve body 30 which terminates at one end with the connector nipple 20 previously described. The valve body 30 is open at the end opposite the connector nipple 20, this end of the valve body opening into a threaded chamber 32 which communicates longitudinally through the valve body 30 with the nipple 20 by means of a longitudinal bore 34 which extends intermittently but substantially throughout the length of the valve body 30. At the interior end of the threaded chamber 32 the longitudinal bore 34 expands into a seal chamber 36 which is of reduced diameter relative to the chamber 32 and of greater diameter than the bore 34, the seal chamber 36 being substantially cylindrical in conformation. Annular beveled bore 38 and annular chamfer bore 40 progressively taper from the chamber 32 to the chamber 36. The seal chamber 36 receives an elastomeric cylindrical seal element 42 which is provided with a longitudinal bore which is aligned with the bore 34, thereby allowing fluid communication through the seal element 42 in a direct path through the valve body 30.

The valve body 30 is provided with an axial bore 46 which extends through said valve body 30 at a location thereof toward the end of the body 30 to which the nipple 20 is formed. The longitudinal bore 34 communicates with the axial bore 46 and, on the side of the bore 46 opposite the nipple 20, the longitudinal bore 34 has a seating chamber 48 which essentially constitutes a portion of the bore 34 which is cylindrical in conformation and slightly increased in diameter relative to the bore 34. The seating chamber 48 actually communicates directly with the axial bore 46. The axial bore 46 is provided with sloped depressions 50 which bound the openings of the bore 46 to ambient at each end of the bore 46.

The axial bore 46 receives structure associated with the thumb turn 26, the thumb turn 26 being mounted to the valve body 30 immediately exteriorly thereof through said axial bore 46. The thumb turn 26 essentially comprises a cylindrical body portion which can be knurled in a coarse diamond pattern as is well known in order to facilitate gripping of said thumb turn 26. Immediately interiorly of the knurled portion of the thumb turn 26 is a reduced-in-diameter cylindrical portion 52 which is received within one of the openings of the axial bore 46. A seal neck portion 54 joins to the cylindrical portion 52 and is further reduced in diameter relative to the portion 52, an O-ring seal element 56 being received about the seal neck portion 54, the O-ring seal element seating in the sloped depression 50. An annular flange 58 is formed immediately interiorly of and joins to the seal neck portion 54 to facilitate sealing by the O-ring seal element 56, the annular flange 58 having eccentric cam 60 connected thereto toward an outer portion thereof, the eccentric cam 60 comprising a substantially cylindrical structural element which joins at the other end thereof to an annular flange 62 which functions identically to annular flange 58 to both mount the cam 60 and to facilitate sealing of an O-ring seal element 64 located in the sloped depression 50 in the other end of the axial bore 46. The O-ring seal element 64 seats about a reduced-in-diameter seal neck portion 66 which extends from and is joined integrally with the annular flange 62, a cylindrical portion 68 of the structure extending from the opposite opening of the axial bore 46 and being of a diameter identical to that of the cylindrical portion 52. The cylindrical portion 68 is provided with an annular groove 70 immediately exteriorly of the opening of the axial bore 46, the groove 70 receiving a O-ring clip 72 which functions to prevent dislodgement of the structure from the axial bore 46.

The eccentric cam 60 effectively is located in that space defined by the intersection of the longitudinal bore 34 and the axial bore 46. The eccentric cam 60 therefore provides no effective blockage of fluid flow through the longitudinal bore 34 regardless of the position of the cam. However, as will be described in detail hereinafter, displacement of the eccentric cam 60 within the axial bore 46 acts to bias valving structure yet to be described to an open position to allow flow of fluid through the valve 10.

The valve 10 further comprises a valve stem 74 which carries the threaded sleeve 24 at the free end of the valve stem 74. The valve stem 74 can be formed of two separate pieces which are threaded together or said stem 74 may be formed of two separate pieces which are then welded together, the two-piece structure facilitating manufacture and assembly. The valve stem 74 is thus seen to be formed of an inner body 76 and an outer stem portion 78. The inner body 76 is substantially cylindrical in conformation and has external threads 80 formed over major portions of the inner end thereof, the threads 80 mating with the threads of the threaded chamber 32 on the valve body 30, thereby to connect the valve stem 74 to the valve body 30. A reduced-in-diameter bevel 82 is formed immediately inwardly of the threads 80, the bevel 82 terminating in a cylindrical portion 84 with the cylindrical portion 84 then terminating in a bevel 86 at the innermost end of the inner body 76. The cylindrical portion 84 is reduced in diameter relative to the bevel 82 as is the bevel 86. A longitudinal bore 88 extends throughout the length of the inner body 76, the bore 88 terminating at the inner end of the body 76 in a cylindrical chamber 90 which is internally threaded. The bore 88 has a beveled neck portion 92 which tapers from the bore 88 to a cylindrical chamber 94 which directly communicates with the interior of the threaded chamber 90. At its outer end, the bore 88 communicates with an increased diameter chamber 96 which is cylindrical in conformation. The inner end of the stem portion 78 is received within the chamber 96 and can be welded therein to join the inner body 76 to the outer stem portion 78. Alternatively, the chamber 96 can be internally threaded and can mate with external threads (not shown) formed on the inner end of the stem portion 78, thereby allowing the inner body 76 and the outer stem portion 78 to be joined by a threaded connection therebetween.

The inner end of the inner body 76 which is comprised of the elements 82, 84 and 86 abuts the seal element 42 when the inner body 76 is received into the threaded chamber 32 by relative rotation to engage the threads in the chamber 32 with the threads 80 on outer surfaces of the inner body 76. The bore 88 of the inner body 76, which continues through the chambers 90 and 94, aligns with the bore 44 of the seal element 42 and the various continuations of the longitudinal bore 34 formed in the valve body 30. A path of communication from the nipple 20 is thus continued through the inner body 76 and on into longitudinal bore 98 formed in the outer stem portion 78. The outer stem portion 78 effectively comprises a cylindrical body portion at medial and inner ends thereof, the stem portion 78 terminating in a cylindrical portion 100 which is of increased outer diameter relative to the remaining cylindrical body portion of said stem portion 78. Within the cylindrical portion 100, the bore 98 tapers outwardly at 102 to outer chamber 104 which is of increased diameter relative to the bore 98. The outer chamber 104 communicates the interior of the valve 10 to ambient at the outer end of said valve 10.

The threaded sleeve 24 is carried on the valve 10 by means of a reduced-in-diameter neck 106 which bounds an opening of a diameter which is slightly greater than the outer diameter of the primary body portion of the outer stem portion 78. The neck 106 effectively abuts annular shoulder 108 which comprises the transition between the major body portion of the stem portion 78 and the cylindrical portion 100. The threaded sleeve 24 is loosely mounted to the valve stem 74 and is capable of sliding along the cylindrical body of the stem portion 78. External surfaces of the sleeve 24 can be knurled in a coarse diamond pattern to facilitate grasping of said sleeve 24 to fit same to an externally threaded connector element such as the port 12 of FIG. 1. When sleeve 24 is fully connected to a threaded connector such as the port 12, the outer shoulder 110 at the outer end of the valve stem 74 is caused to bias against cooperating structure on said threaded connector or, alternatively, structure from the port 12 is received within the outer chamber 104 to provide an effective seal between the valve 10 and structure such as the port 12. In such a conformation, a pathway for fluid flow exists throughout the valve 10 through alignment of the various bores and chambers as described above.

The threaded chamber 90 is seen to receive a spring-loaded valving element 112 which is of substantially conventional design. In particular, the valving element 112 comprises a valve body 114 having pins 116 and 118 extending from opposite sides thereof, the valve body 114 is provided with a spring (not shown) mounted internally thereof, the spring loading the pins 116 and 118 to bias the pin 116 outwardly and the pin 118 inwardly to prevent flow of fluid through the valving element 112. However, when the pin 116 is biased inwardly, thereby causing the pin 118 to be biased outwardly, fluid flow through the valving element 112 is possible. In order to maintain the valving element 112 within the threaded chamber 90, the valving element 112 is provided with external threads which mate with the threads in the chamber 90.

A needle element 120 is received substantially within the bore 98 of the stem portion 78. The needle element 120 is provided with a cylindrical free end portion 122 and a hexagonal body portion 124 which is disposed inwardly of the portion 122, the portion 124 terminating in a spun head 126 which is substantially circular about outer edges and rounded. The spun head 126 is positioned adjacent the pin 118 and can be biased by the pin 118 to move the element 120 within the bore 88 but such that the head 126 is incapable of moving through the bore 88 due to the diameter of the head 126 relative to the diameter of the bore 88. The head 126 thus is disposed in position to be biased outwardly a finite distance, along with the remaining portions of the needle element 120, through contact with the pin 118 of the valving element 112. Displacement of the pin 118 outwardly of the valving element 112, such as due to a biasing force directed outwardly against the pin 116, causes the needle element 120 to be biased outwardly to allow flow of fluid through the end of the stem portion 78, the cylindrical free end portion 122 of the needle element 120 cooperating with associated structure such as within the port 12 to bias such associated structure open to allow fluid flow from the valve 10 into structure on refrigeration apparatus or the like such as is represented by the port 12 of FIG. 1.

A second needle element 128 is disposed within the longitudinal bore 34 in the valve body 30, spun head 130 of the needle element 128 being received within seating chamber 48 immediately adjacent the axial bore 46. Cylindrical free end portion 122 of the needle element 128 extends through the bore 34 and the bore 44 in the seal element 42 to a position capable of contacting the pin 116 of the valving element 112. When the eccentric cam 60 is rotated to the position shown in FIG. 3 which closes the valve 10, the needle element 128 is free to move within the bore 34 with the head 130 and portions of hexagonal body portion 134 being free to slide into the axial bore 46. However, movement of the eccentric cam 64 through rotation of the thumb turn 26 to the position seen in FIG. 2 whereby the valve 10 is opened causes the needle element 128 to be biased outwardly such that the outer end of the cylindrical free end portion 132 contacts the pin 116 and biases said pin 116 toward the valve body 114 of the valving element 112, thereby to open the valving element 112 and to allow free flow of fluid through the valve 10. A certain degree of partial flow can be achieved by partial rotation of the thumb turn 26 to displace the needle element 128 from a full open biasing position relative to the pin 116. During the greater part of the angular freedom of movement of the thumb turn 26, however, the valve 10 is effectively closed.

As seen in FIG. 3, the valve 10 is provided with a cylindrical end portion 136 which replaces the connector nipple 20 of FIG. 2. The cylindrical end portion 136 has a bevel 138 near the free end thereof, the bevel 138 tapering to a cylindrical portion 140 with the cylindrical portion 140 then being surmounted by a bevel 142 at the outermost end thereof. The cylindrical end portion 136 is provided with a bore 144 which is an effective continuation of the bore 34 as is seen in FIG. 2 and in FIG. 3. The bore 144 terminates in a threaded chamber 146 which can receive threaded connectors such as are provided at the ends of pressure hoses and the like which can be connected to sources of pressurized gases such as refrigerant gases. The embodiment of FIG. 3 thus simply provides a different mechanism by which the valve 10 can be connected to a source of refrigerant gas.

While the invention has been explicitly described relative to several embodiments thereof, it is to be understood that the scope of the invention is to be interpreted in light of the definitions provided by the appended claims.

What is claimed is:

1. In a system for charging refrigeration apparatus with refrigerant gas from a portable pressurized source of said gas, the refrigeration apparatus having an inlet port for receiving gas and the source having an outlet port through which gas is discharged, the improvement comprising a valve apparatus capable of connection between the inlet port of the refrigeration apparatus and the outlet port of the gas source, comprising:

means connectible to the valve apparatus for detachably joining a first portion of the valve apparatus to the outlet port of the gas source;

means carried by the valve apparatus for detachably joining a second portion of the valve apparatus to the inlet port of the refrigeration apparatus, a longitudinal channel extending through the valve apparatus to communicate said first and second portions with each other and with ambient and through which fluid is capable of flowing;

valve means carried within the channel for closing the channel to fluid flow when in an unbiased configuration and for allowing fluid flow through the channel when biased to an open position;

manually manipulable means carried by the valve apparatus for biasing the valve means to an open position to allow fluid flow through the valve apparatus, the manually manipulable means including an eccentric cam rotatable internally of the valve apparatus to bias the valve means to an open position, and further including a rotary thumb turn extending externally of the valve apparatus and being connected to the cam such that the cam is rotated to bias the valve means into an open position on rotary manipulation of the thumb turn;

first needle element disposed adjacent to the valve means and biasable outwardly thereof toward the second portion of the valve apparatus to engage and open for fluid transport valving structure associated with the inlet port of the refrigeration apparatus; and, the valve means comprising a valve element having an internal spring, a first pin biased outwardly of the valve element by the spring, a second pin biased inwardly of the valve element by the spring, a second needle element disposed adjacent to the valve means on the opposite end thereof, the second needle element being biased against the first pin by the cam of the manually manipulable means on rotation of the thumb turn to a position biasing the first pin inwardly of the valve element against pressure exerted by the spring, thereby to open the valve element to fluid flow through the valve apparatus and the second needle element being in constant contact with the first pin and the cam in all positions of the cam.

2. In the system of claim 1 wherein the first-mentioned means comprise a barbed connector nipple formed on the first portion of the valve apparatus, the first-mentioned means further comprising a hose having one end thereof received on the nipple and the other end connected to the gas source.

3. In the system of claim 1 wherein the second-mentioned means comprises an internally threaded sleeve carried for relative movement thereto on the second portion of the valve apparatus, the inlet port of the refrigeration apparatus being externally threaded to mate with and connect to the threaded sleeve.

4. In the system of claim 1 wherein the valve apparatus has an axial bore extending therethrough in communication with the channel, the cam being positioned within the axial bore and the thumb turn extending externally of the axial bore for rotation by manual manipulation, thereby to rotate the cam within the axial bore.

5. In the system of claim 4 wherein the manually manipulable means comprise a fastener for maintaining the manually manipulable means within the axial bore.

6. In the system of claim 4 wherein the manually manipulable means comprise a first sealing element disposed in proximity to the inner end of the thumb turn at the opening of the axial bore on the valve apparatus adjacent said thumb turn and a second sealing element carried by the manually manipulable means on the end thereof opposite the thumb turn and in proximity to the opening of the axial bore on the ooposite side of the valve apparatus from the location of the thumb turn.

7. In the system of claim 5 wherein the improvement further comprises a sealing element disposed adjacent to the second needle elements and having a longitudinal bore through which portions of the second needle element extend.

8. In the system of claim 1 wherein the first-mentioned means comprise a threaded connector formed on the first portion of the valve apparatus, the threaded connector mating with and detachably connecting to threaded portions of structure associated with the gas source.

9. In the system of claim 1 wherein the valve apparatus comprises a valve body having the manually manipulable means disposed therein and a valve stem having the valve means disposed therein, the valve body and the valve stem being threaded to detachably connect to each other and to be positioned in controllable relation to each other through the number of mutually engaged threads to position the valve means relative to the manually manipulable means at a desired degree of spacing.

* * * * *